United States Patent [19]

Palmer

[11] Patent Number: 5,471,642
[45] Date of Patent: Nov. 28, 1995

[54] RE-BROADCAST SYSTEM FOR A PLURALITY OF AM SIGNALS

[76] Inventor: James K. Palmer, 134 Fel Mar Dr., San Luis Obispo, Calif. 93405

[21] Appl. No.: 188,030

[22] Filed: Jan. 28, 1994

[51] Int. Cl.$^6$ ............................................. H04B 7/14
[52] U.S. Cl. ........................... 455/17; 455/22; 455/24; 455/103
[58] Field of Search ............................. 455/11.1, 12.1, 455/13.1, 15, 16, 17, 20, 22, 24, 73, 234.1, 253.2, 103; 375/3

[56] References Cited

U.S. PATENT DOCUMENTS

| | | | |
|---|---|---|---|
| 3,283,249 | 11/1966 | Mitchell | 455/17 |
| 3,701,024 | 10/1972 | Knowles et al. | 455/57.1 |
| 4,198,600 | 4/1980 | Oguchi et al. | 455/17 |
| 4,503,562 | 3/1985 | McClellan, III et al. | 455/22 |
| 4,776,032 | 10/1988 | Odate et al. | 455/24 |
| 4,849,963 | 7/1989 | Kawano et al. | 455/15 |
| 5,115,514 | 5/1992 | Leslie | 455/17 |

*Primary Examiner*—Reinhard J. Eisenzopf
*Assistant Examiner*—Andrew Faile
*Attorney, Agent, or Firm*—Daniel C. McKown

[57] ABSTRACT

Apparatus for simultaneously receiving a plurality of AM signals of widely differing strengths on a set of carrier frequencies and for re-broadcasting the AM signals at equalized strengths at either the original carrier frequencies or at a set of carrier frequencies that are offset from the original from the received frequencies by a constant difference. Regardless of whether the re-broadcast carriers are offset, the system includes provision for interrupting the re-broadcast signals by an audio message of general interest or public safety.

5 Claims, 1 Drawing Sheet

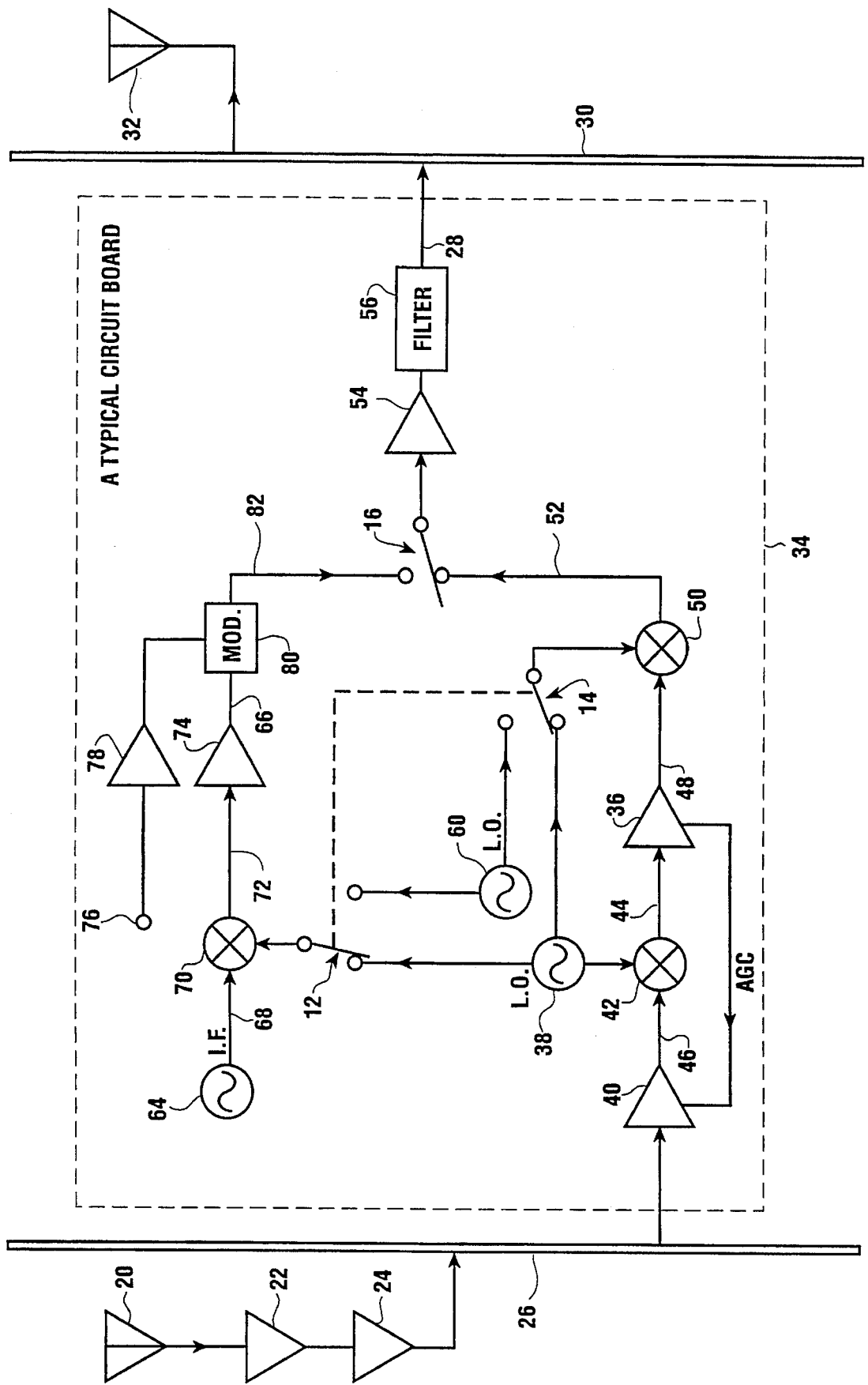

RE-BROADCAST SYSTEM FOR A PLURALITY OF AM SIGNALS

BACKGROUND OF THE INVENTION

1. Field of the Invention

The present invention is in the field of radio and specifically relates to apparatus for simultaneously receiving a plurality of radio signals of widely differing strengths and for re-broadcasting the signals at an equal strength at the received frequencies or at shifted frequencies. In one embodiment, a locally-generated message may be broadcast on all of the channels simultaneously.

2. The Prior Art

One technique for re-broadcasting a plurality of signals is to use a receiver and transmitter dedicated to each signal channel. When the number of channels is large, this approach proves to be too expensive and the apparatus is too bulky. More seriously, this approach requires components that are highly stable in frequency.

A different approach is simply to apply the signals on the receiving antenna to a broadband amplifier, the output of which is connected to a transmitting antenna. This approach is rather naive for two reasons. First, to handle the same number of signals as the present invention, the broadband amplifier would need a power capacity of several kilowatts, which would be undesirable from the standpoint of size and cost. Second, in a real situation the signal strengths are usually quite diverse. A very weak station may be located in frequency quite close to a very strong station. To overcome this difficulty, earlier workers used tunable notch filters to attenuate the stronger signals. Unfortunately, the filters had to have an extremely high Q, so as to be able to attenuate a strong signal without at the same time attenuating a weak signal of a slightly different frequency. As a result of this high performance requirement, the filters tended to be difficult to adjust initially, and they had a tendency to drift.

These difficulties of earlier approaches have been overcome by the present invention.

SUMMARY OF THE INVENTION

One objective of the present invention is to receive a plurality of signals having widely differing strengths and to re-broadcast the signals with equal strength. This objective grew out of the need for a way of providing radio reception in tunnels, where normal reception is cut off.

A second objective of the present invention is to provide apparatus for receiving a number of signals simultaneously on a first set of frequencies and for re-broadcasting the signals simultaneously on a set of offset frequencies. This embodiment of the present invention should be useful in a repeater station where, to avoid feedback, a frequency offset is required. The ability of the apparatus of the present invention to handle a large number of channels simultaneously makes this application attractive.

A third objective of the present invention is to provide apparatus for broadcasting a locally-generated message on a number of frequencies simultaneously. Such apparatus could be of considerable value in civil defense situations where an emergency message must be broadcast on all available channels.

In accordance with the present invention, it is not necessary to dedicate a complete receiver and a complete transmitter to each channel. Instead, only part of a receiver and part of a transmitter are combined. This is possible because in a re-broadcast application there is no real need to detect the modulation, e.g., the audio component.

Instead, in accordance with the present invention, for each carrier a local oscillator is provided, having a frequency that is offset from the carrier frequency by an intermediate frequency. The resulting intermediate frequency signal is then applied to an amplifier, the gain of which is controlled so as to be inversely related to the strength of the intermediate frequency signal. Weak signals are amplified more than strong signals are. In this way, the intermediate frequency signals corresponding to the various channels are equalized.

In a first embodiment of the present invention, these equalized intermediate frequency signals are then mixed with their respective local oscillator signals so as to be up-converted to the original received frequency. The advantage of this technique is that the frequency of the transmitted signal must equal the frequency of the received signal independent of any possible variations in the frequency of the local oscillator.

In accordance with the present invention, equipment redundancy is eliminated by employing a common receiving antenna that is connected to an input bus, and by employing a common output radiator that is connected to an output bus. A plurality of circuit boards, one for each of the frequencies, are connected between the input bus and the output bus. The number of channels can be altered by adding or removing circuit boards. This construction permits 11 channels to be housed in a single rack cabinet approximately 5 inches high.

In a second embodiment of the present invention, the transmitted frequencies are offset by a uniform number of Hertz from the received signals. This is accomplished by up-converting the intermediate frequency signal by mixing it with the output of a second local oscillator, the frequency of which is offset from that of the first local oscillator that was used in down-converting the received signal.

In accordance with a third embodiment of the present invention, a locally-generated message can be broadcast on each of the channels simultaneously. This is accomplished by providing an intermediate frequency oscillator whose output is amplitude or frequency modulated. The amplitude or frequency modulated intermediate frequency signal is then mixed with a local oscillator signal which up-converts it to the respective channel frequency. In this way, an emergency message can be superimposed on existing broadcasts or alternatively may be substituted for the re-broadcast signals.

The novel features which are believed to be characteristic of the invention, both as to organization and method of operation, together with further objects and advantages thereof, will be better understood from the following description considered in connection with the accompanying drawing in which several preferred embodiments of the invention are illustrated by way of example. It is to be expressly understood, however, that the drawing is for the purpose of illustration and description only and is not intended as a definition of the limits of the invention.

BRIEF DESCRIPTION OF THE DRAWING

The drawing is an electronic block diagram showing the components of the present invention.

DETAILED DESCRIPTION OF THE PREFERRED EMBODIMENT

The same drawing will be used to explain several embodiments of the present invention. The embodiment in use at any particular time depends on the positions of the switches 12 and 14 and on the position of the relay 16. The first preferred embodiment is with the switches and relay in the position shown in the drawing.

In the first preferred embodiment, a plurality of AM signals of widely differing signal strengths are re-broadcast at the original carrier frequencies but with equal strengths. If the relay 16 is set to its alternative position, a locally-generated emergency message may be broadcast at the original frequencies.

If the switches 12 and 14 are tripped to their alternative positions, the incoming signals will be re-broadcast at shifted frequencies, and if the relay 16 is in its alternative position, the locally-originated emergency message may be broadcast at the shifted frequencies.

The AM signals on carriers having frequencies of $f_1, \ldots f_i, \ldots f_N$, where N is an integer greater than 1, are received on the antenna 20, amplified by the broadband preamplifier 22, and amplified by the AM band driver amplifier 24 before being applied to an input bus 26.

The output of the circuit shown in the drawing, on conductor 28 is applied to an output bus 30 which is connected to a transmitting antenna or radiator 32. In accordance with the preferred embodiment, the portion of the circuit lying within the dashed line 34 is contained on a single circuit board that is removably connected to the bus 26 and the bus 30. One such circuit board is provided for each of the stations that is to be re-broadcast, and thus a separate circuit board of the type to be described is provided for each of the carrier frequencies of the stations that are to be re-broadcast. This arrangement has the advantage of facilitating the addition and deletion of stations, and provides a uniform format for the circuit boards. In addition, the arrangement permits maintenance work to be performed on one of the circuit boards without interrupting the operations of the other channels.

The First Embodiment

In the first embodiment, the switches 12 and 14 and the relay 16 have the positions shown in the drawing.

The intermediate frequency (IF) amplifier 36 has a narrow pass band centered on a frequency that is constant from one circuit board to the next. In a preferred embodiment, the intermediate frequency is 455 KHz, and the preamplifier 40 is tuned to the frequency of the station being processed by the circuit board. The frequency generated by the first tunable local oscillator 38 is chosen and adjusted to be greater than or less than the frequency of one of the stations by an amount equal to the intermediate frequency. Thus, when the signal from the first local oscillator 38 is mixed with the output of the narrow band preamplifier 40 in the mixer 42, an amplitude modulated signal centered at the intermediate frequency is obtained on the conductor 44. The gain of the IF amplifier 36 is controlled in inverse relation to the strength of the signal on the conductor 46. When the signal is strong, the gain is reduced, and when the signal is weak, the gain of the amplifier 36 is increased. The variation in gain of the amplifier 36 is manifested as a variable DC voltage designated as the automatic gain control (AGC) signal. This DC voltage is then applied to the preamplifier 40 for additional gain control. As a result, the strength of the signal on the conductor 48 is approximately the same from one circuit board to the next.

It is noteworthy that this gain control feature also stabilizes the signal on conductor 48 with respect to temporal variations in the strength of the received signal, such as might be caused by varying atmospheric conditions or varying power levels of the broadcasting station. Thus, the signal on the conductor 48 is an amplitude modulated signal having a carrier frequency equal to the intermediate frequency and having an average amplitude that is equalized from one circuit board to the next and stabilized with respect to temporal variations of the received signal.

This signal is then restored to exactly the same frequency as the incoming carrier by mixing it with the output of the first tunable local oscillator 38 in the mixer 50. The output of the mixer 50 on the conductor 52 is power amplified by the amplifier 54 and then passed through the filter 56 to the conductor 28 that is removably connected to the output bus 30. The amplifier 54 includes a tuned circuit that filters out harmonics and undesired mixer products. The multicoupler filter 56 allows the output of the amplifier 54 to be connected to the common bus 30 without interference from the outputs generated by the other circuit boards.

It is an attractive feature of the design approach that the carrier frequency on the output conductor 28 is identical to the incoming carrier frequency on the conductor 46 regardless of any unwanted variations in the frequency produced by the first tunable local oscillator 38, such as might be caused by environmental variations, so long as those variations are within the bandwidth of the IF amplifier circuit. This is because the same local oscillator frequency is used to down-convert the incoming signal on the conductor 46 and to up-convert the IF signal on the conductor 48. Any variations in the frequency of the first local oscillator 38 are thus canceled out exactly. This feature permits the incoming carrier frequencies to be duplicated exactly in the re-broadcast signal. Because the carrier frequencies are duplicated exactly, there is no question that receivers tuned to various of the original carrier frequencies will also be tuned to the re-broadcast carriers.

The first embodiment, just described, is particularly advantageous for use where broadcast signals are to be re-broadcast in a vehicular tunnel, in which case the transmitting antenna 32 would be located inside the tunnel.

Second Embodiment

In the event the transmitting antenna 32 is located above the surface of the earth, there is a likelihood that the signals transmitted by it would be received by the receiving antenna 20, thereby resulting in an undesirable feedback which could not be controlled by the gain control features of the circuit.

If the re-broadcast circuit is to be used for relaying the original signals, it is desirable to use the second embodiment of the present invention in which the re-broadcast carriers are shifted in frequency from the incoming carriers by a constant frequency difference. In accordance with the second embodiment of the present invention, a second tunable local oscillator 60 is provided, and its frequency differs from the frequency of the first tunable local oscillator 38 by an amount equal to the desired frequency shift. To place the second local oscillator 60 into the circuit, the switches 12 and 14 are both thrown to their alternative positions. Note that the first local oscillator 38 remains connected to the mixer 42 so that the signal on the conductor 44 remains at the intermediate frequency. However, because the second local oscillator 60, instead of the first local oscillator 38, is connected to the mixer 50 due to the altered position of the switch 14, the frequency on the conductor 52 is the intermediate frequency plus the frequency of the second local oscillator which includes the frequency offset.

When the second local oscillator is used, the amplifier 54 and the filter 56 must be tuned to the offset carrier frequency.

Typically in the repeater application, two installations would be spaced a considerable number of miles apart so that the offset frequency produced by the first re-broadcast installation could be shifted back to the original frequencies by the second installation.

Third Embodiment

In the third embodiment, provision is made for interrupting the re-broadcast signals and for transmitting in their place a message that is common to all of the carriers, such as an emergency message. This feature is brought into play by altering the position of the relay 16, regardless of the position of the switches 12 and 14; that is, regardless of whether the carrier frequencies are shifted or not for re-broadcasting.

In the third embodiment, an intermediate frequency oscillator 64 is provided, an its frequency must necessarily be identical to the intermediate frequency signal on the conductor 48. A carrier is produced on the conductor 66 by mixing the IF signal on the conductor 68 in the mixer 70 with either the output of the first local oscillator 38 or the output of the second local oscillator 60. The output of the mixer 70 on the conductor 72 is amplified by the RF amplifier 74 to produce the desired carrier on the conductor 66. An audio signal is applied to the terminal 76 and amplified by the amplifier 78 before being applied to the modulator 80 that produces an amplituded modulated signal on the conductor 82. The AM signal on the conductor 82 is applied, via the relay 16, to the RF amplifier 54, the filter 56 and the antenna 32.

In a variation of the third embodiment, the modulator 80, still connected to the amplifier 78 and terminal 76, is interposed in the conductor 68. In this variation, the IF output of the oscillator 64 is amplitude modulated before being up-converted by the mixer 70.

This third embodiment could be used advantageously for interrupting the re-broadcast signals by a message of general interest or public safety. Another potential application is in a bunker or underground portion of a building, such as a hospital or an office building where it might be desirable to page an individual.

Thus, there has been described a system for re-broadcasting AM signals of widely differing strengths at equal strengths on the original carrier frequencies or for re-broadcasting on offset frequencies. With either arrangement, it is possible to interrupt the re-broadcast signals with a message of general interest or public safety.

The foregoing detailed description is illustrative of several embodiments of the invention, and it is to be understood that additional embodiments thereof will be obvious to those skilled in the art. The embodiments described herein together with those additional embodiments are considered to be within the scope of the invention.

What is claimed is:

1. Apparatus for simultaneously receiving a plurality of AM signals of widely differing strengths on carriers having frequencies of $f_1, \ldots f_i, \ldots f_N$ where N is an integer greater than 1 and for re-broadcasting the AM signals at an equal strength and at the original carrier frequencies, said apparatus comprising in combination:

a receiving antenna;

an input bus connected to said receiving antenna;

an output radiator;

an output bus connected to said output radiator;

a plurality of circuit boards, one for each of said plurality of AM signals, each of said plurality of circuit boards connected to said input bus and to said output bus, the circuit board for carrier frequency $f_i$ including a local oscillator producing an output having a frequency equal to $f_i \pm f_o$, where $f_o$ is a chosen intermediate frequency (IF) which is the same for all of the circuit boards;

a down-converter connected to said input bus and connected to said local oscillator and producing an amplitude modulated carrier of frequency $f_o$ as an output;

an IF amplifier connected to receive the output of said down-converter, having a controllable gain, and producing an output;

first means connected to said IF amplifier for controlling its gain in inverse relation to the strength of the carrier of frequency $f_i$, whereby the gain is reduced if the carrier of frequency $f_i$ is strong, and whereby the gain is increased if the carrier of frequency $f_i$ is weak;

an up-converter connected to said IF amplifier and connected to said local oscillator for mixing the output of said IF amplifier of frequency $f_o$ with the output of said local oscillator of frequency $f_i \pm f_o$ to produce on an output terminal an output of frequency $f_i$ having a signal strength that is substantially uniform for all of said plurality of circuit boards; and, second means connecting the output terminal of said up-converter to said output bus.

2. The apparatus of claim 1 wherein said apparatus further comprises a preamplifier interposed between said input bus and said down-converter.

3. The apparatus of claim 1 wherein said second means further comprise a radio frequency (RF) amplifier interposed between the output terminal of said up-converter and said output bus.

4. Apparatus for simultaneously receiving a plurality of AM signals of widely differing strengths on carriers having frequencies of $f_1, \ldots f_i, \ldots f_N$, where N is an integer greater than 1, for re-broadcasting the AM signals at an equal strength and at the original carrier frequencies, and for selectively broadcasting on the original carrier frequencies a common modulating signal, said apparatus comprising in combination:

a receiving antenna;

an input bus connected to said receiving antenna;

an output radiator;

an output bus connected to said output radiator;

a plurality of circuit boards, one for each of said plurality of AM signals, each of said plurality of circuit boards connected to said input bus and to said output bus, the circuit board for carrier frequency $f_i$ including a local oscillator producing an output having a frequency equal to $f_i \pm f_o$ where $1 \leq i \leq N$ and where $f_o$ is a chosen intermediate frequency (IF) which is the same for all of the circuit boards;

a down-converter connected to said input bus and connected to said local oscillator and producing an amplitude modulated carrier of frequency $f_o$ as an output;

an IF amplifier connected to receive the output of said down-converter, having a controllable gain, and producing an output;

first means connected to said IF amplifier for controlling its gain in inverse relation to the strength of the carrier of frequency $f_i$, whereby the gain is reduced if the carrier of frequency $f_i$ is strong, and whereby the gain is increased if the carrier of frequency $f_i$ is weak;

a first up-converter connected to said IF amplifier and connected to said local oscillator for mixing the output of said IF amplifier of frequency $f_o$ with the output of said local oscillator of frequency $f_i \pm f_o$ to produce on an output terminal an output of frequency $f_i$ having a signal strength that is substantially uniform for all of said plurality of circuit boards;

an oscillator generating an output signal having a frequency equal to the intermediate frequency $f_o$;

a second up-converter connected to said oscillator for receiving the output signal at frequency $f_o$ of said oscillator, connected to said tunable local oscillator for receiving the output of said tunable local oscillator at frequency $f_i \pm f_o$, and producing in response thereto a carrier of frequency $f_i$ as an output;

a modulator connected to said second up-converter for receiving the output of said second up-converter, and responsive to an applied modulating signal to produce an amplitude modulated carrier of frequency $f_i$; and, switching means connected to said first up-converter, connected to said modulator, and connected to said output bus for selectively applying the output of said first up-converter and the output of said modulator to said output bus.

5. Apparatus for simultaneously receiving a plurality of AM signals of widely differing strengths and carriers having frequencies of $f_1, \ldots f_i, \ldots f_N$, where N is an integer greater than 1, and for re-broadcasting the AM signals at an equal strength at frequencies $f_1+\Delta, \ldots f_i+\Delta, \ldots f_N+\Delta$, where $\Delta$ is a chosen constant offset frequency, said apparatus comprising in combination:

a receiving antenna;

an input bus connected to said receiving antenna;

an output radiator;

an output bus connected to said output radiator;

a plurality of circuit boards, one for each of said plurality of AM signals, each of said plurality of circuit boards connected to said input bus and to said output bus, the circuit board for carrier frequency $f_i$ including a first local oscillator producing an output having a frequency equal to $f_i \pm f_o$ where $1 \leq i \leq N$ and where $f_o$ is a chosen intermediate frequency (IF) which is the same for all of the circuit boards;

a down-converter connected to said input bus and connected to said first local oscillator and producing an amplitude modulated carrier of frequency $f_o$ as an output;

an IF amplifier connected to receive the output of said down-converter, having a controllable gain, and producing an output;

first means connected to said IF amplifier for controlling its gain in inverse relation to the strength of the carrier of frequency $f_i$, whereby the gain is reduced if the carrier of frequency $f_i$ is strong, and whereby the gain is increased if the carrier of frequency $f_i$ is weak;

a second local oscillator producing an output having a frequency equal to $f_i \pm f_o + \Delta$;

an up-converter connected to said IF amplifier and connected to said second local oscillator for mixing the output of said IF amplifier of frequency $f_o$ with the output of said second local oscillator of frequency $f_i + f_o + \Delta$ to produce on an output terminal an output of frequency $f_i + \Delta$ having a signal strength that is substantially uniform for all of said plurality of circuit boards; and, second means connecting the output terminal of said up-converter to said output bus.

* * * * *